(12) United States Patent
Proulx et al.

(10) Patent No.: US 6,519,857 B1
(45) Date of Patent: Feb. 18, 2003

(54) FIXED LINE HEAD FOR FLEXIBLE LINE ROTARY TRIMMERS

(75) Inventors: Richard A. Proulx, Alta Loma, CA (US); Sasha Johnson, Walnut, CA (US)

(73) Assignee: Proulx Manufacturing, Inc., Rancho Cucamonga, CA (US)

( * ) Notice: Subject to any disclaimer, the term of this patent is extended or adjusted under 35 U.S.C. 154(b) by 0 days.

(21) Appl. No.: 09/992,048

(22) Filed: Nov. 21, 2001

(51) Int. Cl.[7] ............................................... A01D 50/00
(52) U.S. Cl. ........................................... 30/276; 30/347
(58) Field of Search ................... 30/276, 347; 56/12.7; 114/217, 219

(56) References Cited

U.S. PATENT DOCUMENTS

| | | | |
|---|---|---|---|
| 3,708,967 A | 1/1973 | Geist et al. ................... | 56/12.7 |
| 4,062,114 A | 12/1977 | Luick ........................... | 30/276 |
| 4,190,954 A | 3/1980 | Walto ........................... | 30/347 |
| 4,411,069 A | * 10/1983 | Close et al. .................... | 30/276 |
| 4,453,486 A | * 6/1984 | Harken ....................... | 114/218 |
| 4,644,655 A | 2/1987 | Bottamiller et al. .......... | 30/347 |
| 4,685,279 A | 8/1987 | Gullett ........................ | 56/12.7 |
| 4,756,146 A | 7/1988 | Rouse ......................... | 56/12.7 |
| 5,433,006 A | 7/1995 | Taguchi ........................ | 30/276 |
| 5,758,424 A | 6/1998 | Iacona et al. .................. | 30/347 |
| 5,887,348 A | 3/1999 | Iacona et al. .................. | 30/276 |

* cited by examiner

*Primary Examiner*—Douglas D. Watts
(74) *Attorney, Agent, or Firm*—Holland & Knight LLP

(57) ABSTRACT

A cutting head for rotary trimmers in which two relatively short fixed lengths of flexible cutting line are inserted into opposed channels in the head and are secured in place by a pair of spring biased toothed cams. Each of the cams is pivotally mounted on a post within the housing adjacent one of the channels and defines a curvilinear camming surface having a plurality of uniformly spaced teeth thereon that project into the channels at increasing angles of inclination from the outermost tooth to the innermost tooth for engaging the line. A pair of torsion springs bias the cams to pivot on their mounting teeth such that the backsides of the teeth are continually urged toward the openings to the channels thereby allowing line to be inserted inwardly into the head past the toothed cams but retained by the cams against any outwardly directed forces acting on the line. The cams are symmetrically balanced about their axes of rotation so as to be unaffected by centrifugal force acting thereon during use.

13 Claims, 5 Drawing Sheets

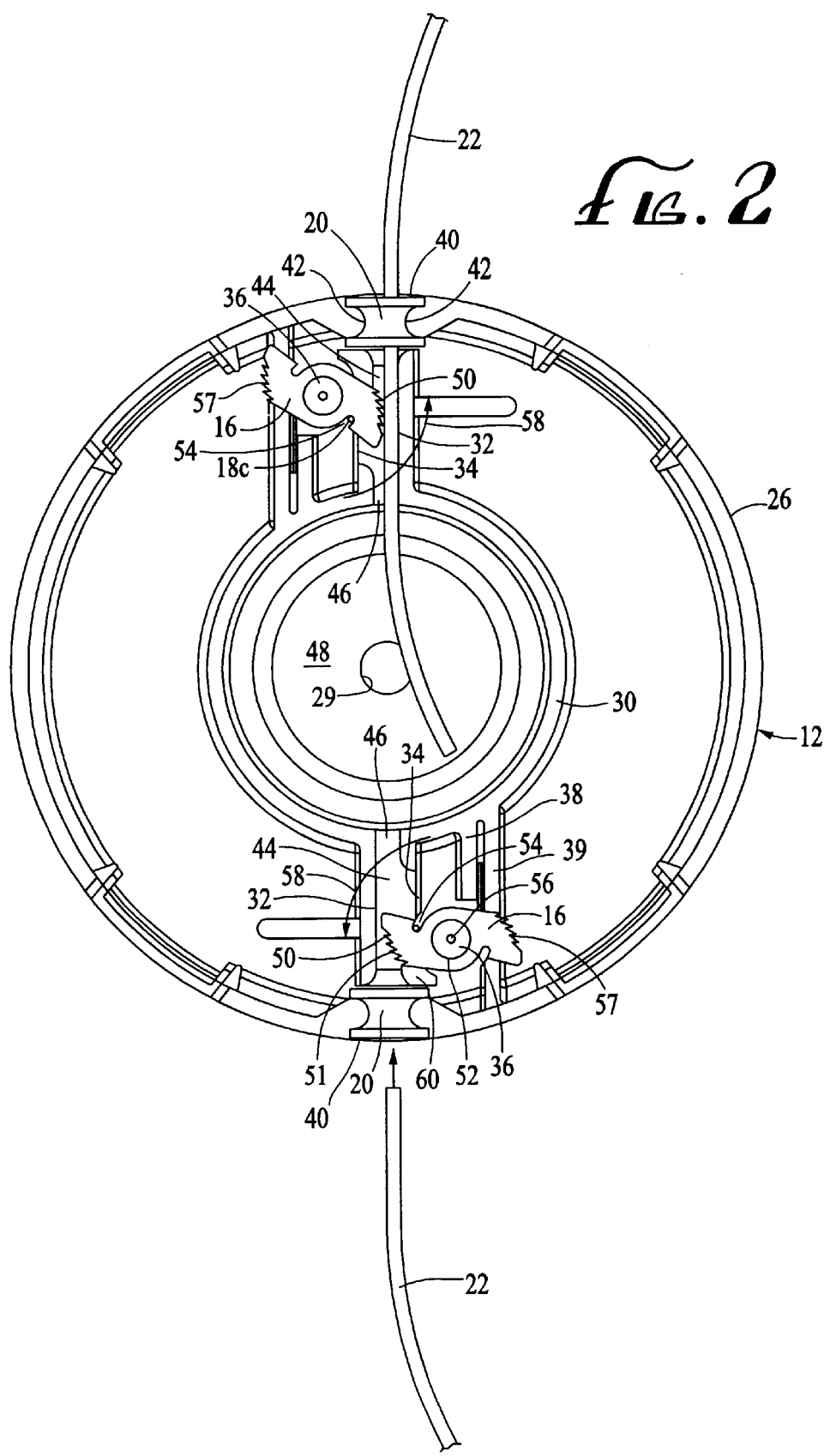

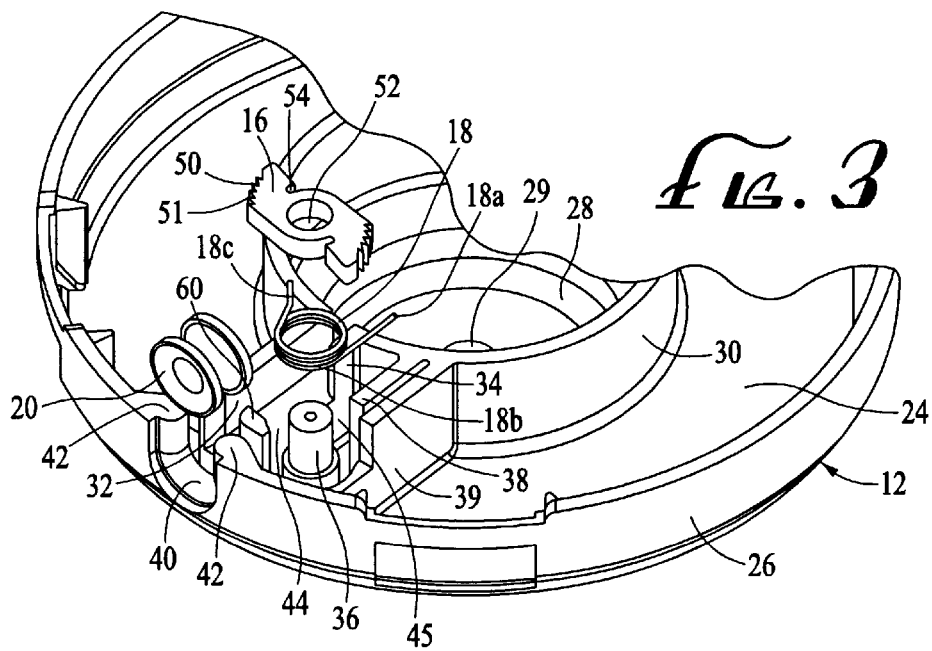
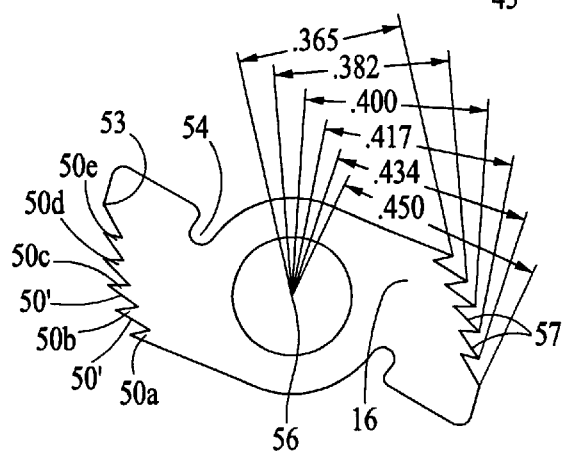
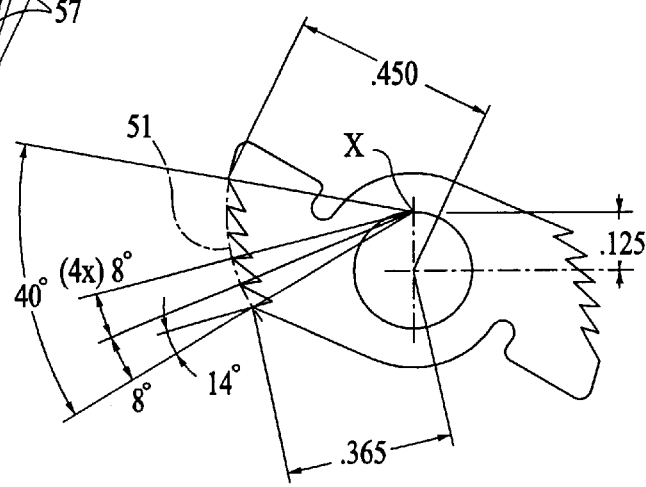

FIXED LINE HEAD FOR FLEXIBLE LINE ROTARY TRIMMERS

BACKGROUND OF THE INVENTION

The present invention is directed to cutting heads for use in flexible line rotary trimmers. Flexible line rotary trimmers are commonly used for cutting vegetation such as grass and weeds, particularly along walks, fences and flower beds and around trees. These devices comprise a rotary driven head that carries one or more lengths of monofilament line mounted within a housing. Extended end portions of each line project from the housings through guides in the side wall of the housing. As the head rotates at high speed, the end portions of the line are caused to project outwardly from the housing by the centrifugal forces acting thereon and function as cutting blades.

The majority of trimmer heads presently in use employ two separate monofilament lines which are wrapped about a common spool mounted within the head housing. The lines project from the spool and housing through diametrically opposed guides in the side wall of the trimmer housing. When the cutting line projecting from the head breaks or becomes overly worn, fresh line must be extended from the head and the old line severed and discarded. In what are commonly termed manual-type heads, the drive motor, which can be gas or electric, is shut down and a line indexing mechanism on the stationary head is actuated to pay out additional line from the head. This is typically accomplished by the mechanism temporarily disengaging the spool from the head and rotating the spool a predetermined amount relative to the head. By simply pulling on the cutting line, a measured length of fresh line is pulled from the spool and the old line severed and discarded. In an effort to reduce the down time for line replacement, heads commonly referred to as "bump-feed" heads were developed in which the indexing mechanism is activated while the head is still rotating. The user simply presses the rotating head against the ground depressing an actuator button on the bottom of the head which temporarily disengages the line carrying spool from the housing, allowing the spool to rotate relative to the housing. The inertia of the line and centripetal force acting on the line extending from the rapidly rotating head (often erroneously referred to as centrifugal force) causes fresh line to be pulled from the spool and extended from the housing. A metering mechanism limits the relative rotation of the spool with respect to the housing and thus limits the length of the fresh lines paid out of the head. A knife guard provided at a desired radial distance from the central axis of rotation severs the worn lines, leaving the desired lengths of fresh line projecting from the head. In an effort to further streamline the line replacement process, "automatic heads" were developed. Such heads typically include a spring biased pawl-type mechanism that reacts to an imbalance in the inwardly and outwardly directed forces acting on the rapidly rotating line that results from a loss of mass in the line extending from the head due to wear or breakage. The activation of the pawl mechanism temporarily disengages the spool from the housing allowing relative rotation therebetween and the paying out of a metered amount of line. Excess material is again automatically severed by a knife guard as with the bump-feed type head.

While this evolution of the flexible line rotary trimmers from the manual head to the automatic head has significantly reduced operator time and effort in replacing worn and broken line, these advancements have met with some resistance. Each of these types of cutting heads require the user to replace the line when the original supply has been consumed. For the casual home user this can present a problem. Depending on the particular head, generally at least two separate lines, several feet in length, must be wrapped about the spool. If this is not done properly, the line may tangle within the head, interfering with the withdrawal of fresh line and requiring disassembly of the head and rewinding of the line. The more complicated the line feed mechanism, the more critical is the proper winding of the line within the head. Proper winding is particularly important in automatic heads where the slightest tangle can interfere with the functioning of the line pay out mechanism. Thus, there remains a need for a flexible line rotary trimmer head which greatly simplifies the task of line replacement for the home user.

Several attempts have been made to provide a more user-friendly rotary cutting head. Such heads typically employ one or more short lengths of a line which are anchored within the head in lieu of the longer lengths of line wrapped about an interior spool. These heads are frequently referred to as fixed line cutting heads. While fixed line cutting heads have eliminated the need to carefully wrap the line about the spools to prevent tangles, many such heads still require disassembly to replace worn or broken line. A fixed line head which does not require disassembly to effect line replacement is found in U.S. Pat. No. 4,062,114, issued to Luick and entitled "VEGETATION CUTTING APPARATUS." The cutting heads disclosed therein are provided with one of several differently configured channels terminating in a reduced diameter portion proximate the side wall of the head. A short length of flexible cutting line extends through the channel and extends radially from the head. The line is held in place by an enlarged member secured to the inner end of the length of cutting line which is translatable along the channel but cannot pass through the reduced diameter portion thereof. While such a head and line configuration provides for relatively simple line replacement, each length of replacement line must be provided with a suitable enlarged member at one end thereof, significantly increasing the cost of operation. In addition, if the cutting line were to break at the eyelet or outlet end of the line channel, line removal may be difficult.

Other attempts to provide a fixed line cutting head in which the line can be easily and quickly replaced are found in U.S. Pat. Nos. 5,758,424 and 5,887,348, both issued to Fernando and Ignazio Iacona and entitled "HEAD FOR STRING TRIMMER." U.S. Pat. No. 5,758,424 discloses a trimmer head in which a pair of opposed lengths of cutting line are inserted into the head adjacent spring biased cams. The springs cause the cams to press against the line with sufficient force to hold the line in place when the head is at rest. To provide a greater line securement force during use, the cams are configured such that their centers of gravity are located between the posts on which they are mounted and an opposed wall against which they press the respective lengths of cutting line. The centrifugal force acting on the cams during the rapid rotation of the cutting head causes the cams to pivot outwardly and press tightly against the lengths of cutting line to secure the line to the head during use. While such a head facilitates line replacement in that it allows fresh lengths of replacement line to simply be inserted into the head through opposed openings therein and be held in place by the spring biased cams, the Iacona head is dependent on rotational velocity for the tight securement of the cutting line. Accordingly, when such a head is used in heavy brush, the drag on the line will cause the rotational speed of the head to drop, decreasing the centrifugal force acting on the cams and thus the gripping forces of the cams against the lengths of line. As a result, the line could be pulled from the head by the brush, rendering the head ill-suited for use in heavy brush.

U.S. Pat. No. 5,887,348 discloses a fixed line head which utilizes a spring-biased mechanism to hold the line in place with a constant gripping force. The mechanism, however, extends through the top of the head housing so that it can be manipulated by the user when the head is at rest to release and secure the line. The extension of the securement mechanism beyond the surface of the head renders the mechanism susceptible to becoming entangled during use which would tend to pull the mechanism outwardly from the head and possibly release the cutting line at a relatively high velocity. Thus, while this embodiment of a fixed line head is not dependent on rotational velocity for its gripping force, it also is ill-suited for use in heavy brush.

It would be desirable to provide a cutting head for flexible line trimmers that retains the ease of line removal and replacement exhibited by the Iacona fixed line cutting heads, but is neither reliant on rotational velocity for line securement nor susceptible to the inadvertent release of the cutting line during use under the severest of cutting conditions. The fixed line cutting head of the present invention obtains these results.

SUMMARY OF THE INVENTION

Briefly, the present invention comprises a fixed line head for flexible line rotary trimmers in which two relatively short fixed lengths of cutting line are inserted into opposed channels in the head through diametrically opposed openings in the side wall of the trimmer head housing and are secured in place by a pair of spring biased toothed cams. Each of the cams is pivotally mounted on a post within the housing adjacent one of the channels and defines a curvilinear camming surface. The cam teeth are disposed along and project from the curved cam surface into one of the channels at varying inward inclinations toward a radially extending support wall on the opposite side of the channel. A pair of torsion springs bias the cams to pivot on their mounting posts such that the backsides of the teeth are continually urged toward the openings to the channels.

As line is inserted into the proposed head, it passes along the channels between the support wall and one of the cams and abuts the backside of one or more of the cam teeth. As line is pushed further into the housing, it pushes against the cam teeth and causes the cam to pivot against the force of the spring and away from the line, allowing the line to be inserted between the wall and cam. The two lengths of line are pushed into the head until the inner ends emerge through openings in the bottom of the head. The line is then released. When the head is at rest, the line is held in place by the springs urging the backsides and tips of several of the cam teeth against the line, pressing the line against one of the support walls. If one were to pull outwardly on the line, the inclined cam teeth will snag the line and tend to pivot the cam in the direction of the spring force. However, as the cams pivot outwardly, the lengths of line are pressed against the support walls, preventing further pivoting of the cams. As a result, the cam teeth will dig into the line and prevent its withdrawal. Thus, when centrifugal force pulls on the extended line during use, the tooth cams act like ratchets and prevent withdrawal of the line. As the cams allow for inward movement of the line, worn or broken line is simply removed by grasping the inner ends of the line exposed in the openings in the bottom of the head and pulling the line through the head. Replacement line is then simply inserted through the openings in the side wall of the head.

It is therefore the principal object of the present invention to provide a cutting head for flexible line rotary trimmers that simplifies line removal and replacement while providing a tight securement of the line to the head independent of the rotational velocity of the head.

It is another object of the present invention to provide a cutting head for flexible line rotary trimmers that simplifies line removal and replacement which is of simple construction and economical to manufacture.

It is still another object of the present invention to provide a cutting head for flexible line trimmers that simplifies line removal and replacement and is adapted for use in heavy brush.

It is a further object of the present invention to provide a cutting head for flexible line rotary trimmers that simplifies line removal and replacement while providing a tight securement of the line to the head independent of the rotational velocity of the head and is adaptable for use with cutting line of varying diameters.

It is yet another object of the present invention to provide a cutting head for flexible line rotary trimmers that simplifies line removal and replacement without the need for any disassembly.

These and other objects and advantages of the present invention will become readily apparent from the following detailed description taken in conjunction with the accompanying drawings.

BRIEF DESCRIPTION OF THE DRAWINGS

FIG. 2 is a bottom plan view of the cutting head of the present invention with the bottom cover removed to illustrate the head housing and components contained therein.

FIG. 3 is a partial exploded view of the head housing, one of the line securement cams and associated torsion spring and line guide.

FIGS. 4a and 4b are enlarged plan views of one of the toothed cams of the present invention illustrating various dimensional parameters thereof.

DETAILED DESCRIPTION OF THE PREFERRED EMBODIMENT

Figure 1:
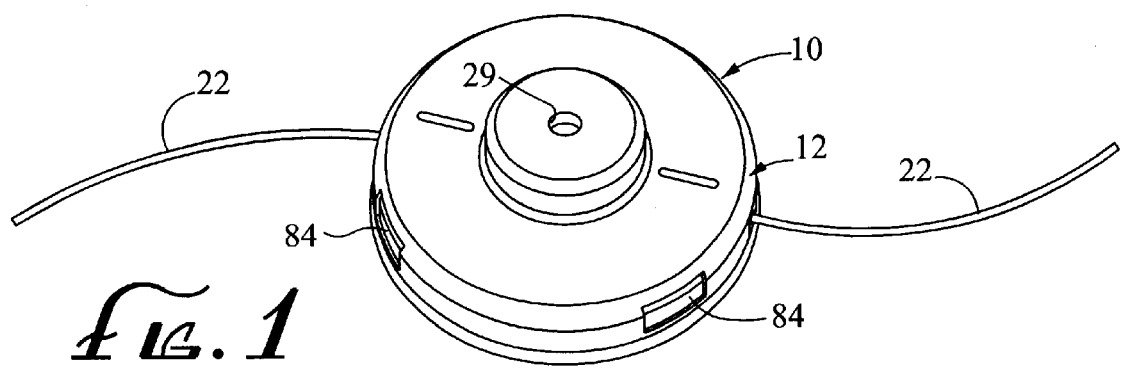
FIG. 1 is a perspective view of the cutting head of the present invention.
Figure 7:
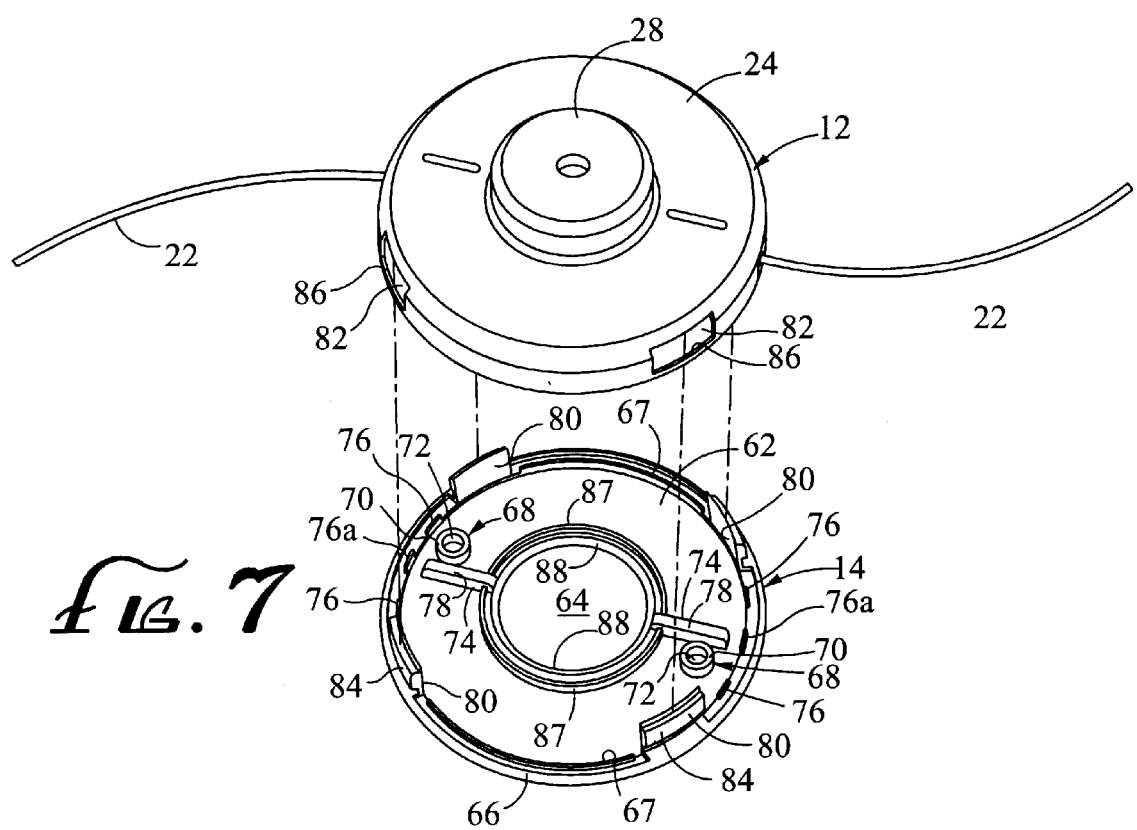
FIG. 7 is an exploded view of the housing and bottom cover of the cutting head of the present invention.
Figure 8:
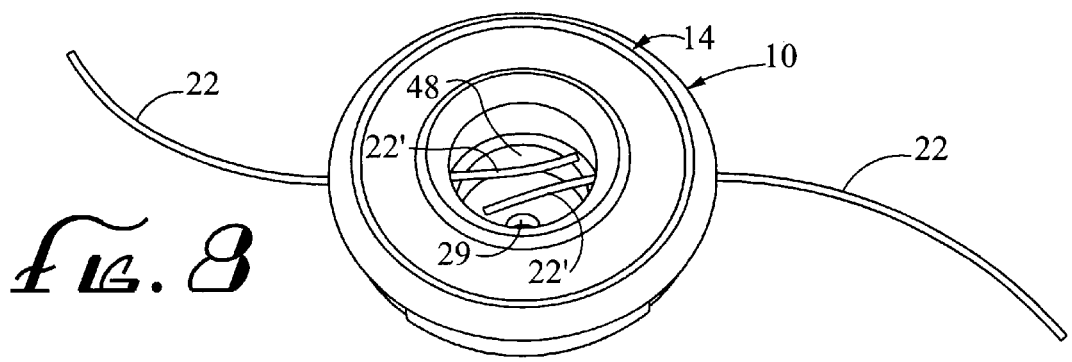
FIG. 8 is a bottom plan view of the cutting head of the present invention illustrating the exposure of the inner ends of the cutting line for line removal.
Figure 5:
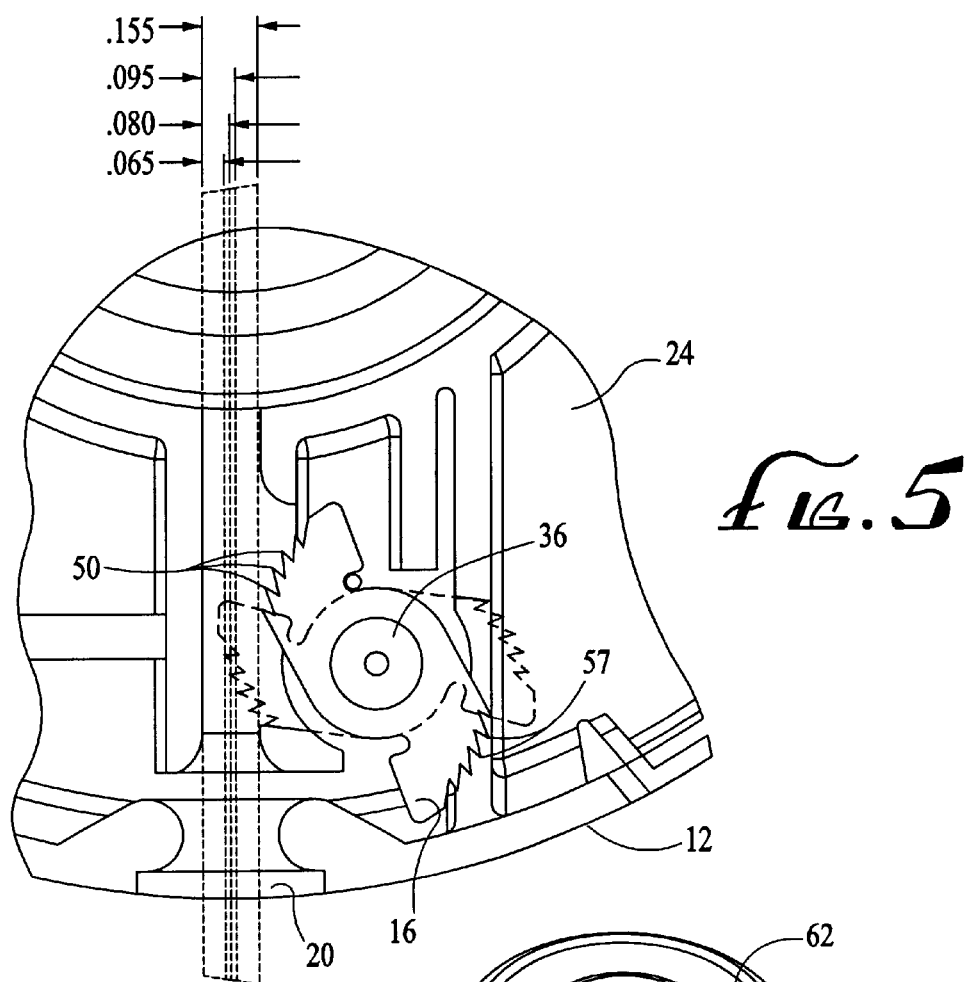
FIG. 5 is a partial plan view of the cutting head of the present invention illustrating positioning of a line engagement cam against a length of maximum diameter cutting line and showing the relative positioning of the other common diameter lines usable in the head.

Referring now in detail to the drawings, the cutting head 10 of the present invention is adapted to be secured to the threaded lower end of a rotatable drive shaft on a gasoline or electric powered rotary trimmer (not shown). The head 10 comprises a housing 12, a cover 14, and pairs of opposed toothed cams 16, torsion springs 18 and line guides 20 for releasably securing within the head 10 a pair of opposed lengths 22 of monofilament nylon cutting line. The housing 12 and cover 14 are both preferably of single-piece construction and formed by injection molding glass reinforced nylon such as nylon 6 with 33% glass fill. As seen in FIG. 1, the housing 12 is secured to and disposed above cover 14. However, in the other figures, the housing 12 is shown in an inverted disposition to illustrate its interior configuration and the components of the head 10 contained within the housing. To avoid any ambiguity, references herein to directions and the relative positioning of component parts (e.g. upper, lower, above, left and right) will be made according to the directions and positioning as seen in FIGS. 2 and 3. As seen therein, the housing 12 defines a lower annular base or wall portion 24 terminating at its outer end in a cylindrical upstanding perimeter wall portion 26 and at its inner end in an axially projecting cylindrical knob portion 28. It is to be understood however, that in actual use, wall portion 24 will define the upper surface of the head 10 and knob portion 28 will project upwardly as shown in FIGS. 1 and 7. The knob portion 28 has a centrally disposed aperture 29 therein that receives the threaded end portion of the trimmer drive shaft for the attachment of the head to the shaft by means of a washer and threaded bolt (not shown). Housing 12 also defines an interior upstanding cylindrical wall portion 30 inwardly spaced from the perimeter wall portion 26, and generally opposed pairs of channel walls 32 and 34, cam mounting posts 36 and spring retention walls 38 and 39.

The perimeter wall portion 26 of the cutting head housing 12 has two diametrically opposed slots 40 formed therein adapted to receive and retain a pair of conventional line guides 20. The perimeter wall portion 26 also defines a pair of inwardly inclined guide retention walls 42 laterally adjacent each of slots 40 that allow the guides 20 to be readily inserted into their respective slots and retain the guides in opposed alignment as seen in FIG. 2. The opposed pairs of channel walls 32 and 34 in the housing define a pair of opposed radial channels 44 for receiving the lengths 22 of cutting line through the openings in guides 22. Channel walls 32 define support walls for securing the cutting line, as will be described. Channel walls 34 each define a cut out area 45 in the upper portion thereof such that one of the line securement cams 16 can project therethrough into channel 44. For the reasons to be explained, the inner cylindrical wall 30 in housing 12 also defines a pair of openings 46 therein at the end of channels 44 so that the lengths 22 of nylon cutting line can be inserted through guides 20, into and through channels 44 and openings 46 into a central interior area 48 of the housing accessible from the exterior of the housing.

The line securement cams 16 are pivotally mounted on posts 36 adjacent channels 44. Each cam defines a plurality of pointed line engagement teeth 50 disposed along a curvilinear end surface 51, a centrally disposed aperture 52 sized to receive one of the mounting posts 36 and a spring arm retention channel 54. The cams are preferably die cast from a zinc material and are configured so as to be symmetrically balanced about the central vertical axes 56 of apertures 52 (i.e. their axes of rotation) so that the cams will be unaffected by centripetal or centrifugal force during use. The cams 16 are also preferably symmetrical in configuration so as to provide the cams with an additional set of line engagement teeth 57 which allows the cams to be turned over and reversed in the event one or more of the engaging teeth 50 becomes broken or dulled.

Figure 6:
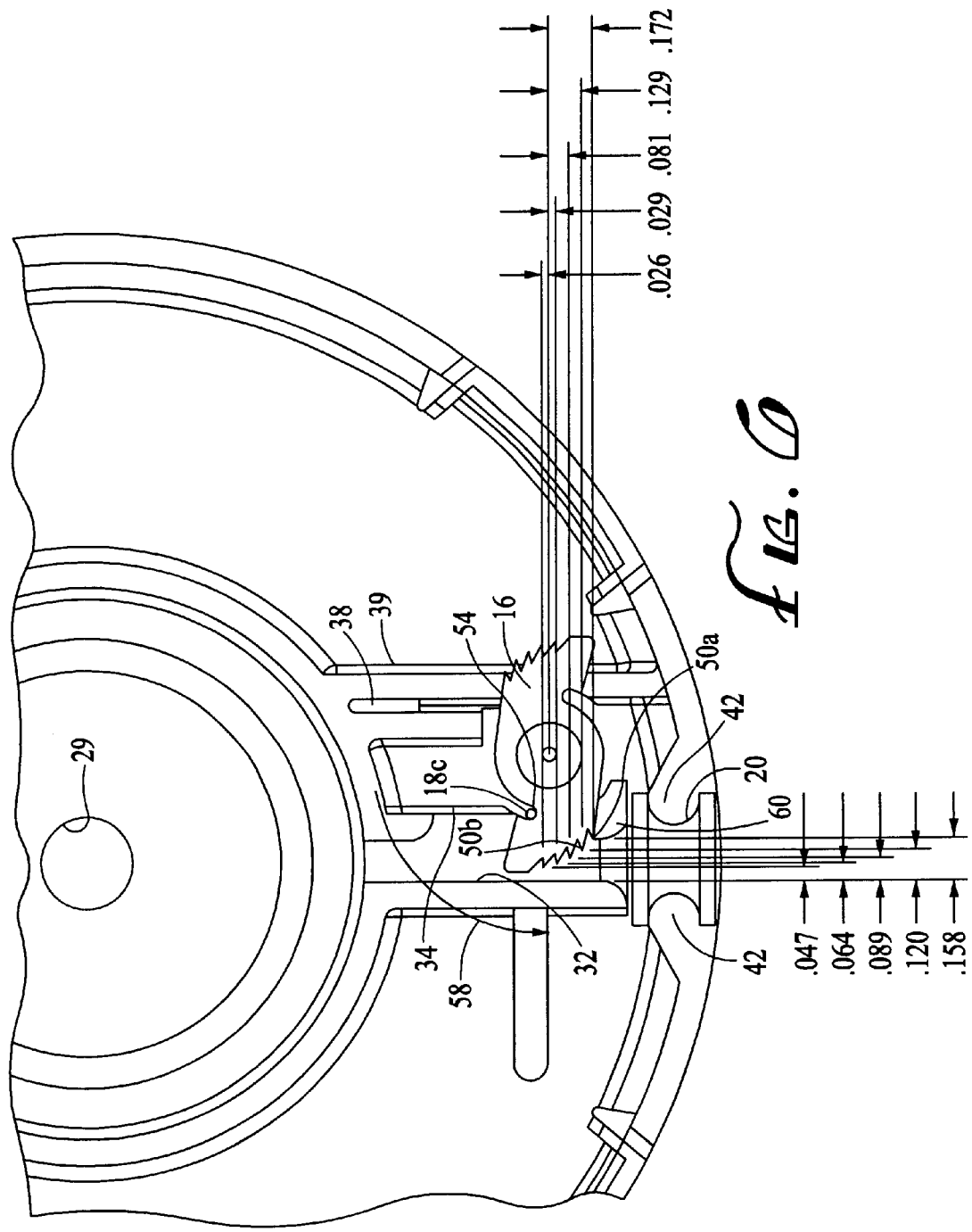
FIG. 6 is an enlarged partial bottom plan view of the housing illustrating various dimensional parameters of the cam teeth and of the positioning of the cam teeth relative to the housing channel wall.

The torsion springs 18 each define a horizontal leg portion 18a, a coil portion 18b and a vertical leg portion 18c. The springs 18 are mounted on the cam pivot posts 49 such that the horizontal leg 18a of each spring is disposed between the parallel spring retention walls 38 and 39 and the vertical leg portion 18c projects upwardly into the channel 54 in the cam 16 as seen in FIGS. 2 and 3. To facilitate assembly, the leg portions 18c are sized to project slightly above the upper flat surface of the cam. Each torsion spring 18 biases one of the cams 16 in the direction of arrows 58 in FIG. 2 such that the backsides 50' of cam teeth 50 are urged toward the line guides 20 at the openings to their respective channels 44. Springs 18 each exert about 0.5 in. lbs. of force at their fully open position which is illustrated in FIG. 6. A stop 60 is provided in housing 12 adjacent each of the line guides 20 and cams 16 to limit the pivotal movement of the cams in the direction of arrows 58.

To accommodate and secure the lengths 22 of cutting line in place, the curvilinear end surfaces 51 on cams 16 are each preferably provided with at least five pointed teeth 50a–50e, each tooth being spaced from an adjacent tooth or teeth by about 8° as illustrated in FIG. 4b and configured such that the backside (outwardly facing surface) of the outermost tooth 50a in each cam abuts one of the stops 60, positioning the cam with respect to the adjacent channel wall 32 such that the backside of the second tooth 50b is perpendicular to or slightly inclined inwardly with respect to the surface of channel wall 32 as illustrated in FIG. 6. The backsides or outwardly facing surfaces of each of the remaining teeth are also inclined inwardly with respect to the surface of wall 32 at slightly increasing angles from tooth 50c to 50e. As a result, when lengths 22 of cutting line are inserted into channels, the line will abut the backside or sides of one or more teeth (depending on the size of the line) and cause the cam 16 to pivot in the direction opposite that of arrow 58 (FIG. 2), allowing the length of cutting line to pass between the cam 16 and the opposed channel wall 32.

Figure 9:
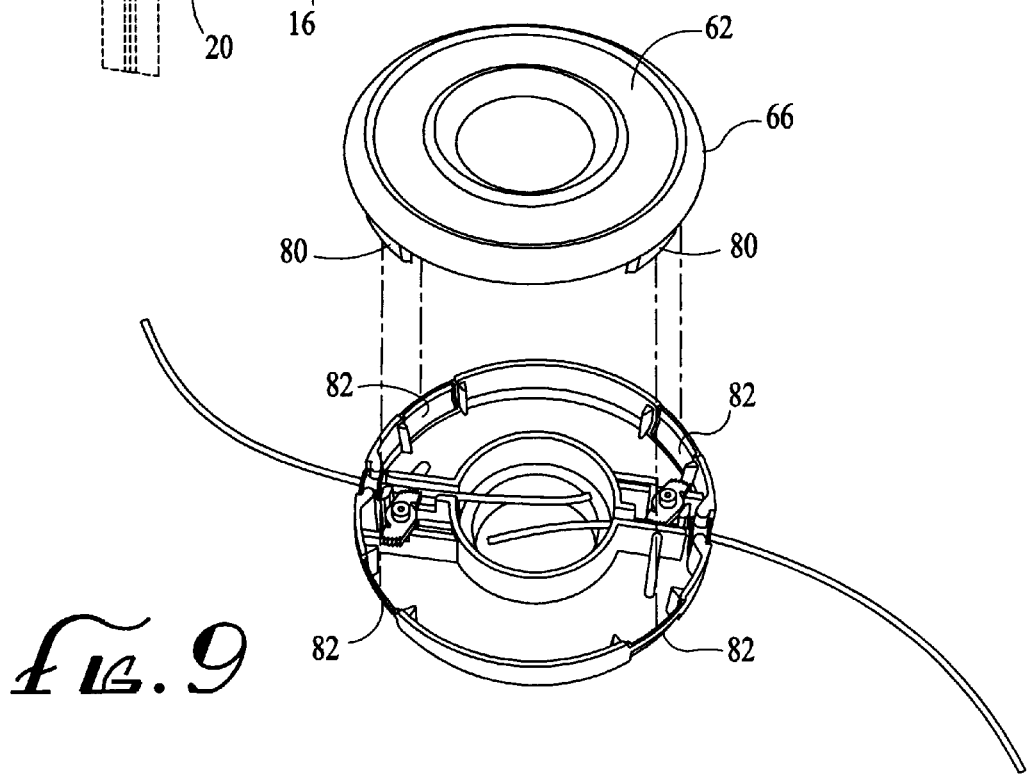
FIG. 9 is an exploded view of the housing and bottom cover of the cutting head of the present invention as seen from the underside thereof.

The lower cover 14, best seen in FIGS. 7 and 9, defines an annular lower surface 62, disposed about a central opening 64 and terminating at its outer edge in an outwardly inclined flange portion 66. A pair of annular projections 68 are provided on the interior of surface 62 to maintain the proper alignment of the line engagement cams 16 on mounting posts 36. Projections 68 each define an annular end surface 70 and a cylindrical channel 72 adapted to receive the portions of the mounting posts projecting through cams 16 such that when the cover 14 is in place on head 12, posts 36 extend into channels 36 and the end surfaces 70 of the projections 68 abut against the flat portions of the cams adjacent posts 36. Cover 14 also defines pair of aligned axially projecting and radially extending wall portions 74 adjacent annular projections 68 and a pair of smaller projections 76a radially spaced from wall portions 74 such that when the cover 14 is secured to the underside of the housing 14, the upper surfaces 78 (as shown in FIG. 7) will extend along and form bottom wall surfaces for channels 44 to ensure the passage of cutting line through channels 44 into central area 48, while projections 76a bear against and secure the line guides 20 in place.

To secure the lower cover 14 to the housing 12, the cover is provided with a plurality of axially extending resilient locking tabs 80 that are adapted to be received in openings 82 formed in the perimeter wall 26 of housing 12. Tabs 80 are each provided with an outwardly projecting tapered portion 84, as seen in FIG. 9, so that when the housing and cover are urged together, the resilient tabs will deflect inwardly until the outwardly projecting tapered portions 84 clear the edge portions 86 adjacent openings 82 in perimeter wall 26 and snap outwardly through the openings, securing the cover to the head.

To prevent debris from entering the interior of the cutting head 10, the outer and inner perimeter portions of the cover and head are configured for a sealing engagement. The outer perimeter of the lower cover 14 is provided with a pair of opposed raised arcuate rib portions 67 and opposed pairs of arcuate projections 76 which are spaced from the guide retention projections 76a and locking tabs 80. The inner perimeter portion of the cover is provided with a pair of radially spaced upstanding annular ribs 87 and 88 disposed about the central opening 64. Upon the securement of cover 14 to the housing 12, the extended end portion of the inner cylindrical wall 30 on housing 12 projects into the annular space between inner walls 87 and 88 on the cover to seal the inner perimeter of the head. Ribs 67 and projections 76 on the outer perimeter of the cover 14 extend into the interior of the housings 12 adjacent the inner surface of the perimeter wall portion 26 of the housing. The spacings between projections 76, guide retention projections 76a and tabs 80 accommodate the guide retention walls 42 and structural elements on the housing so as to effectively seal the outer perimeter portion of the head. It should also be noted that the inclined flange portion 66 extending about the perimeter of the lower cover 14 provides an increased material thickness about the perimeter of the cover to define a protective wear ring for the head 10.

The preferred configuration of cutting head 10 is designed to accommodate monofilament cutting line having diameters within the range of 0.080 inches to and including 0.155 inches. In the preferred cam configuration, the curvilinear surface 51 on which the line engagement teeth 50a–50e are formed traces an arc which defines a constant radius of 0.412 inches about a point X located 0.125 inches inwardly of pivot axis 56 as illustrated in FIG. 4b. The distance from the central pivot axis 56 of each cam, which coincides with the central axis of each cam pivot post 49, to wall 32 is about 0.487 inches. The spacings between wall 32 to the tips of teeth 50a–50e are also illustrated in FIG. 6. Cams 16 also preferably define a blunted tooth 53 inwardly adjacent tooth 50e and spaced therefrom at an angle of about 8°. The addition of blunted tooth 53 prevents tooth 50e from peeling the smallest diameter line (0.080 in.) when such line is used in head 10 and subjected to relatively strong outwardly directed forces. Tooth 53 achieves this result by simply obstructing the path of the peeled material, resulting in a secure grip on the small diameter line.

The above-recited dimensions provide a cutting head 10 particularly suited for use with those line sizes most typically used in gasoline powered trimmers. The present invention, however, is readily adaptable for use with the smaller line sizes employed on electrically powered trimmers. To accommodate the lighter line, the mounting posts 36 could simply be moved closer to the line supporting walls 32. In addition, the head 10 would be reduced in size from about 5 in. in diameter to about 4 in.

To secure a length 22 of cutting line in head 10, one simply inserts the line through one of the line guides 20 into channel 44. As the line passes through channel 44, it pushes against the backside of one or more of the cam teeth 50 causing the cam 16 to pivot against the force of spring 18. The length of cutting line is pushed into the head until the inner end 22' thereof passes through the opening 46 in the inner cylindrical wall 30 in the head housing and into the interior area 48 of the housing. The length of line is then released. A similar length 22 of cutting line is then inserted into the opposed channel 44 in the cutting head 10. When the head is at rest, the two lengths of line are held in place by the torsion springs 18 urging the backsides and tips of one or more of the cam teeth against the line, pressing the lengths of line against the channel walls 32. If one were to pull outwardly on the lengths of line, the particular cam tooth or teeth engaging the line will snag the line and tend to pivot the cam in the direction of the spring force indicated by arrows 58, pressing the line against adjacent channel wall 32 and preventing further pivotal movement of the cam. Continued pulling on the line causes the cam teeth 50 to dig into the line and prevent its withdrawal. Thus, when the inertia and centripetal force pull on the lengths 22 of cutting line extending from the rapidly rotating head during use, the toothed cams 16 will hold the lengths of line in place. In the event the line encounters heavy brush, slowing the rotation of the head, the cams will continue to prevent withdrawal of the line as the cams are unaffected by the rotational speed of the head. However, due to the inward inclination of the cam teeth 50 relative to the longitudinal axis of channels 44, cams 16 do allow for the inward movement of the line. Accordingly, when the extended line becomes overly worn or broken, the inner end portions 22' of the lengths of line are exposed in the central area 48 of the head and can be readily grasped by the user through the central opening 64 in the lower cover 14 so that the lines can be easily pulled inwardly through and from the head. Replacement line is then simply inserted through the openings in the guides 20 in the manner above described.

While cutting head 10 is configured to receive and secure two opposed lengths 22 of cutting line, it is to be understood that three or more lines could also be releasably secured with the present invention. The desired pluralities of housing walls, openings in the housing walls, radial channels and cams and associated torsion springs would simply be equiangularly spaced about the head as described above to provide the desired number of line retention mechanisms while maintaining the balance of the cutting head. Various other changes and modifications also may be made in carrying out the present invention without departing from the spirit and scope thereof. Insofar as these changes and modifications are within the purview of the appended claims, they are to be considered as part of the present invention.

We claim:

1. A cutting head for rotary trimmers using a pair of fixed lengths of flexible line as cutting implements comprising:

a housing defining an annular wall portion, a perimeter wall portion extending axially from said annular wall portion and having a pair of opposed openings therein, a line support wall adjacent each of said openings and extending inwardly therefrom, a pair of opposed channels, each of said channels extending radially inwardly from one of said openings along one of said support walls for receiving a length of flexible line therein, and a pair of pivot posts, each of said posts being adjacent one of said channels proximate one of said openings in said perimeter wall portion of said housing;

a pair of line engagement cams, one of said cams being mounted on each of said posts for pivotal movement about a central axis of said post, said cams being configured so as to be symmetrical about said central axes and each define a plurality of line engaging pointed teeth uniformly spaced along a curvilinear surface from an outermost tooth to an innermost tooth such that said teeth project from said outermost tooth to said innermost tooth into one of said channels at increasing angles of inclination with respect to one of said support walls and at decreasing distances from said wall;

a pair of spring members, one of said members being operatively connected between one of said cams and one of said posts for urging said curvilinear surfaces on said cams in a first direction toward said openings; and a pair of stops for limiting pivotal movement of said cams in said first direction.

2. The cutting head of claim 1 including a cover adapted to mate with and be releasably secured to said housing, said cover defining a pair of radially extending projections, each of said projections extending along and across one of said channels upon said cover being secured to said housing so as to form a bottom wall for said channel to retain a length of cutting line within said channel as said line is inserted through said channel.

3. The cutting head of claim 2 wherein said housing defines an interior circular wall portion inwardly spaced from said perimeter wall portion, said interior wall portion circumscribing a central area and defining a pair of opposed openings therein, said openings being radially aligned with said channels in said housing for communicating said channels with said central area and wherein said cover includes a central opening therein axially aligned with said central area in said housing upon said cover being secured to said housing for providing external access to said central area whereby lengths of flexible line inserted through said channels into said central area can be grasped in said central area and pulled inwardly through said channels and from said head to effect removal of worn and broken line.

4. The cutting head of claim 1 wherein said cams each define a blunted tooth inwardly spaced along said curvilinear surface from said innermost pointed tooth thereon.

5. The cutting head of claim 1 wherein said curvilinear surfaces on said cams are configured to trace segments of constant radius arcs about central axes located radially inwardly of the central axes of said pivot posts.

6. The cutting head of claim 4 wherein said curvilinear surfaces on said cams are configured to trace segments of constant radius arcs about central axes located radially inwardly of the central axes of said pivot posts.

7. A cutting head for rotary trimmers using a plurality of fixed lengths of flexible line as cutting implements comprising:

a housing defining an annular wall portion, a perimeter wall portion extending axially from said annular wall portion and having a plurality of equiangularly spaced openings therein, a line support wall adjacent each of said openings and extending inwardly therefrom, a plurality of channels, each of said channels extending radially inwardly from one of said openings along one of said support walls for receiving a length of flexible line therein, and a pivot post disposed adjacent each of said channels proximate one of said openings in said perimeter wall portion of said housing;

a plurality of line engagement cams, one of said cams being mounted on each of said posts for pivotal movement about a central axis of said post, said cams being configured so as to be symmetrically balanced about said central axes and each define a plurality of line engaging pointed teeth uniformly spaced along a curvilinear surface from an outermost tooth to an innermost tooth such that said teeth project from said outermost tooth to said innermost tooth into one of said channels at increasing angles of inclination with respect to one of said support walls and at decreasing distances from said wall;

a plurality of spring members, one of said members being operatively connected between one of said cams and one of said posts for urging said curvilinear surfaces on said cams in a first direction toward said openings; and a plurality of stops for limiting pivotal movement of said cams in said first direction.

8. The cutting head of claim 7 including a cover adapted to mate with and be releasably secured to said housing, said cover defining a plurality of radially extending projections, each of said projections extending along and across one of said channels upon said cover being secured to said housing to retain a length of cutting line within said channel as said line is inserted through said channel.

9. The cutting head of claim 7 wherein said housing defines an interior circular wall portion inwardly spaced from said perimeter wall portion, said interior wall portion circumscribing a central area and defining a plurality of equiangularly spaced openings therein, said openings being radially aligned with said channels in said housing for communicating said channels with said central area and wherein said cover includes a central opening therein axially aligned with said central area in said housing upon said cover being secured to said housing for providing external access to said central area whereby lengths of flexible line inserted through said channels into said central area can be grasped in said central area and pulled inwardly through said channels and from said head to effect removal of worn and broken line.

10. The cutting head of claim 7 wherein said cams each define a blunted tooth inwardly spaced along said curvilinear surface from said innermost pointed tooth thereon.

11. The cutting head of claim 7 wherein said curvilinear surfaces on said cams are configured to trace segments of constant radius arcs about central axes located radially inwardly of the central axes of said pivot posts.

12. The cutting head of claim 11 wherein said curvilinear surfaces on said cams are configured to trace segments of constant radius arcs about central axes located radially inwardly of the central axes of said pivot posts.

13. The cutting head of claim 11 including a cover adapted to mate with and be releasably secured to said housing, said cover defining a plurality of radially extending projections, each of said projections extending along and across one of said channels upon said cover being secured to said housing to retain a length of cutting line within said channel as said line is inserted through said channel.

* * * * *